(12) United States Patent
Okada

(10) Patent No.: US 10,574,860 B2
(45) Date of Patent: Feb. 25, 2020

(54) IMAGE SCANNER

(71) Applicant: BROTHER KOGYO KABUSHIKI KAISHA, Nagoya-shi, Aichi-ken (JP)

(72) Inventor: Hidekazu Okada, Hashima (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/280,262

(22) Filed: Feb. 20, 2019

(65) Prior Publication Data
US 2019/0268505 A1 Aug. 29, 2019

(30) Foreign Application Priority Data

Feb. 23, 2018 (JP) ................................ 2018-030530

(51) Int. Cl.
| | | |
|---|---|---|
| H04N 1/04 | (2006.01) | |
| H04N 1/60 | (2006.01) | |
| H04N 1/48 | (2006.01) | |
| H04N 1/407 | (2006.01) | |

(52) U.S. Cl.
CPC ........... *H04N 1/6086* (2013.01); *H04N 1/482* (2013.01); *H04N 1/484* (2013.01); *H04N 1/6008* (2013.01); *H04N 1/4076* (2013.01)

(58) Field of Classification Search
None
See application file for complete search history.

(56) References Cited

U.S. PATENT DOCUMENTS

| | | | |
|---|---|---|---|
| 2007/0285739 A1 | 12/2007 | Nakano et al. | |
| 2008/0123163 A1 | 5/2008 | Nakano et al. | |
| 2010/0182652 A1* | 7/2010 | Tanaka ................... | H04N 1/401 358/461 |
| 2011/0043873 A1 | 2/2011 | Maruo | |
| 2013/0016259 A1* | 1/2013 | Meng ..................... | H04N 5/361 348/294 |
| 2014/0029065 A1* | 1/2014 | Nakazawa ............. | H04N 1/407 358/461 |

(Continued)

FOREIGN PATENT DOCUMENTS

| | | |
|---|---|---|
| JP | H08-248529 A | 9/1996 |
| JP | 2007-028413 A | 2/2007 |
| JP | 2007-306486 A | 11/2007 |

(Continued)

*Primary Examiner* — Cheukfan Lee
(74) *Attorney, Agent, or Firm* — Scully, Scott, Murphy & Presser, PC

(57) ABSTRACT

An image scanner includes: a document table; a document cover; a light source; an image sensor; and a circuit configured to: acquire, as pre-reading black data, the line data that is generated by the image sensor in a state where the light source is turned off; after acquiring the pre-reading black data, acquire, as line image data, the line data that is generated by the image sensor in a state where light is emitted from the light source to an original document supported on the document table; after acquiring the line image data, acquire, as post-reading black data, the line data that is generated by the image sensor in a state where the light source is turned off; determine black reference data based on the post-reading black data and the pre-reading black data; and perform black correction on the line image data based on the black reference data.

8 Claims, 8 Drawing Sheets

(56) References Cited

U.S. PATENT DOCUMENTS

2016/0134777 A1* 5/2016 Horiguchi ............ H04N 1/0057
 358/1.12
2017/0353618 A1* 12/2017 Fusayasu ................ G06T 1/00

FOREIGN PATENT DOCUMENTS

| JP | 2008-160807 A | 7/2008 |
| JP | 2011-217339 A | 10/2011 |

* cited by examiner

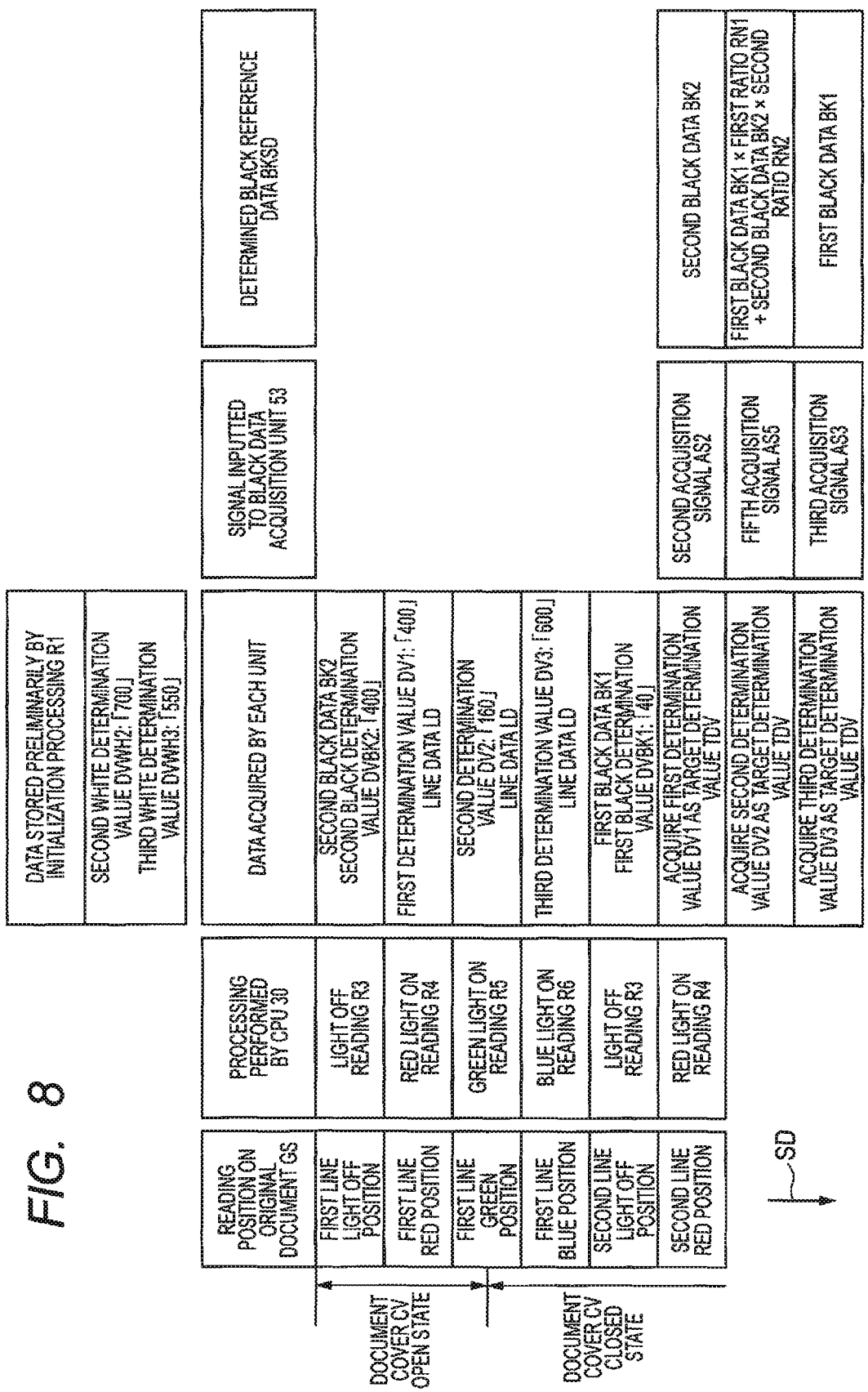

IMAGE SCANNER

CROSS REFERENCE TO RELATED APPLICATIONS

This application claims priority from Japanese Patent Application No. 2018-030530 filed Feb. 23, 2018. The entire content of the priority application is incorporated herein by reference.

TECHNICAL FIELD

This disclosure relates to an image scanner.

BACKGROUND

A known image scanner turns off a light source and detects outside light in a state where an open-close type document cover is open for reducing an influence of outside light that enters from the outside of the apparatus.

An image input device emits light of red, green, and blue from a light source to one line of an original document in a main scanning direction, converts reflection light of that light into electric signals to read an image, then turns off the light source to read one line, and performs arithmetic processing on the both read data, thereby reducing the influence of outside light.

SUMMARY

According to one aspect, this specification discloses an image scanner. The image scanner includes a document table, a document cover, a light source, an image sensor, and a circuit. The document table is configured to support an original document. The document cover is configured to move between an open state in which the document table is exposed and a closed state in which the document table is covered. The light source is configured to emit light. The image sensor is configured to receive light and to perform photoelectric conversion on the received light to generate line data that is data of a plurality of pixels in one line extending in a main scanning direction. The circuit is configured to: acquire, as pre-reading black data, the line data that is generated by the image sensor in a state where the light source is turned off; after acquiring the pre-reading black data, acquire, as line image data, the line data that is generated by the image sensor in a state where light is emitted from the light source to an original document supported on the document table; after acquiring the line image data, acquire, as post-reading black data, the line data that is generated by the image sensor in a state where the light source is turned off; determine black reference data based on the post-reading black data and the pre-reading black data; and perform black correction on the line image data based on the black reference data.

According to another aspect, this specification also discloses a method of performing black correction in an image scanner. The image scanner includes a document table, a document cover configured to move between an open state in which the document table is exposed and a closed state in which the document table is covered, a light source configured to emit light, and an image sensor configured to receive light and to perform photoelectric conversion on the received light to generate line data that is data of a plurality of pixels in one line extending in a main scanning direction. The method includes: acquire, as pre-reading black data, the line data that is generated by the image sensor in a state where the light source is turned off; after acquiring the pre-reading black data, acquire, as line image data, the line data that is generated by the image sensor in a state where light is emitted from the light source to an original document supported on the document table; after acquiring the line image data, acquire, as post-reading black data, the line data that is generated by the image sensor in a state where the light source is turned off; determine black reference data based on the post-reading black data and the pre-reading black data; and perform black correction on the line image data based on the black reference data.

BRIEF DESCRIPTION OF THE DRAWINGS

Embodiments in accordance with this disclosure will be described in detail with reference to the following figures wherein:

FIG. 8 is an explanatory diagram for illustrating a process of reading a first line of an original document GS.

DETAILED DESCRIPTION

In the above-described image input device, if a document cover is closed in the middle of reading an original document in a state where the document cover is opened or if the document cover is opened in the middle of reading an original document in a state where the document cover is closed, the amount of outside light changes significantly in the line that is being read when the document cover is opened or closed, which causes a streak or a band.

In view of the foregoing, an example of an object of this disclosure is to provide an image scanner that suppresses an occurrence of a streak or a band even if a document cover is opened or closed in the middle of reading an original document.

<Configuration of Image Scanner SM>

Figure 1:
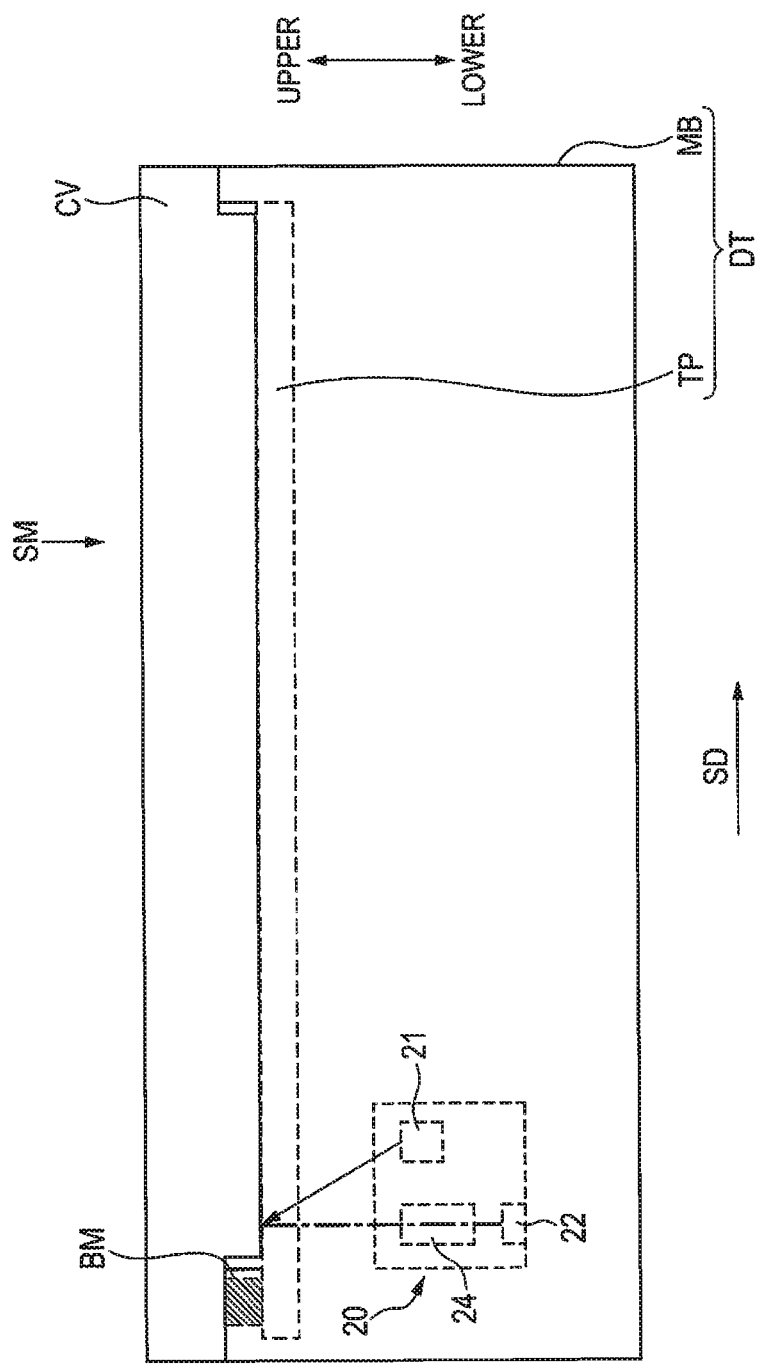
FIG. 1 is a view showing the internal configuration of an image scanner SM according to an embodiment of this disclosure.
Figure 2:
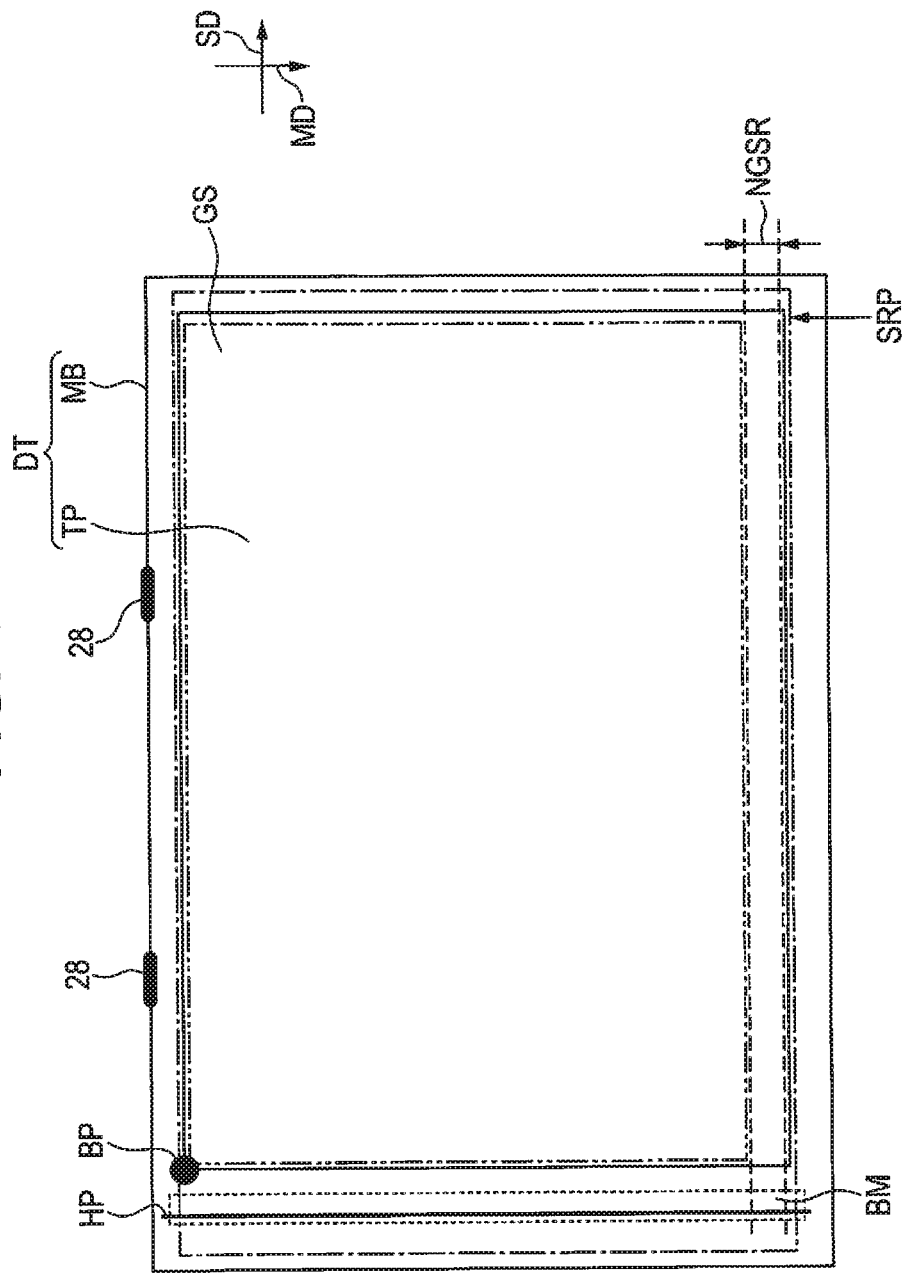
FIG. 2 is a top view of a document table DT.

The configuration of an image scanner SM according to this embodiment will be described with reference to the accompanying drawings. In the following description, the rightward direction in FIG. 1 is regarded as the downstream direction of a sub-scanning direction SD, the downward direction in FIG. 2 is regarded as the downstream direction of a main scanning direction MD, and the rightward direction in FIG. 2 is regarded as the downstream direction of the sub-scanning direction SD.

The image scanner SM includes a document table DT and a document cover CV. The document table DT includes a main body MB and a transparent plate TP. The main body MB is a housing that accommodates various members (for example, the transparent plate TP and a reader 20). As indicated by the single-dot chain line in FIG. 2, the transparent plate TP is housed in the main body MB and fixed to the main body MB. The transparent plate TP supports an original document GS of a reading target. The document cover CV includes pivot shafts 28 on the far side of the main body MB (the far side in the direction perpendicular to the drawing surface of FIG. 1 or the upper side in FIG. 2). The document cover CV is opened or closed from the near side of the main body MB (the near side in the direction perpendicular to the drawing surface of the FIG. 1 or the lower side in FIG. 2). That is, the document cover CV is opened or closed between an open state where the transparent plate TP is exposed and a closed state where the transparent plate TP is covered. A surface of the document cover CV that covers (faces) the transparent plate TP in the closed state has a white color.

The image scanner SM further includes the reader 20 housed in the main body MB and located below the transparent plate TP. The reader 20 moves in a sub-scanning direction SD (that is, the lateral direction in FIG. 1) relative to the main body MB. The reader 20 executes reading operation of the original document GS supported on the transparent plate TP. The reader 20 is formed from a CIS (abbreviation of contact image sensor), and specifically includes a light source 21, a rod lens 24, and a light receiver 22 (an image sensor). The light source 21 is constituted by red, green, and blue light-emitting diodes, and emits light toward the transparent plate TP. The rod lens 24 receives reflected light of light mainly emitted from the light source 21 and forms an image on the light receiver 22.

The light receiver 22 includes 2600 photoelectric conversion elements 23 arrayed in the main scanning direction MD, and incorporates an analog shift register and an amplifier (neither of which is shown). An output from each photoelectric conversion element 23 is the amount of light received at each pixel in the main scanning direction MD. The leading pixel of the photoelectric conversion elements 23 is the first pixel, which is located at the most upstream side in the main scanning direction MD shown in FIG. 2. The final pixel of the photoelectric conversion elements 23 is the 2600th pixel, which is located at the most downstream side in the main scanning direction MD shown in FIG. 2. In this embodiment, one line is a pixel group constituted by pixels ranging from the leading pixel to the final pixel in the main scanning direction MD.

Referring to FIG. 2, the upper surface of the document table DT includes the upper surface of the main body MB and a surface of the transparent plate TP which is exposed to the document cover CV. The main body MB has the pivot shafts 28 disposed at the upstream side in the main scanning direction MD. As indicated by the single-dot chain line in FIG. 2, the transparent plate TP has a rectangular shape constituted by long sides extending along the sub-scanning direction SD and short sides extending along the main scanning direction MD. Referring to FIG. 2, the solid line indicates the surface of the transparent plate TP which is exposed to the document cover CV (that is, the upper surface of the transparent plate TP). The original document GS is placed on the transparent plate TP with reference to a reference position BP as a base point. The pivot shafts 28 are shafts that pivot when the document cover CV is opened and closed, and are disposed at two positions at the upstream side in the main scanning direction MD of the main body MB.

The reference position BP is located at the most upstream position on the upper surface (the surface exposed to the document cover CV) of the transparent plate TP in the main scanning direction MD and also located at the most upstream position in the sub-scanning direction SD. A reading end position SRP is located at the most downstream position on the upper surface of the transparent plate TP in the sub-scanning direction SD. The image scanner SM reads an image of the original document GS across the range from the reference position BP in the sub-scanning direction SD to the reading end position SRP as a reading range. The reference position BP in the sub-scanning direction SD is the position of the leading line in the sub-scanning direction SD. A non-document region (outside-document region) NGSR in the main scanning direction MD is a range from the position of a most downstream pixel in the main scanning direction MD to the position of a pixel that is 10-pixel away upstream from the most downstream pixel in the main scanning direction MD, in the surface of the transparent plate TP exposed to the document cover CV. The non-document region NGSR is a region ranging from the 2591st pixel to the 2600th pixel in the main scanning direction MD. In a state where the original document GS of the largest size that can be scanned by the image scanner SM is placed on the transparent plate TP by using the reference position BP as the base point, when the document cover CV is in an open state, the non-document region NGSR is not covered by the original document GS and the reader 20 reads light from outside of the image scanner SM. When the document cover CV is in a closed state, the non-document region NGSR is not covered by the original document GS and the reader 20 reads an image of the document cover CV having a white color.

The image scanner SM further includes a reference member BM fixed on the upper surface of the transparent plate TP. The reference member BM is provided on an end portion of the transparent plate TP which is located at the upstream side (that is, the left side in FIG. 2) in the sub-scanning direction SD. The reference member BM is a white member with a reference density extending along the main scanning direction MD. A home position HP is a position on the reference member BM in the sub-scanning direction SD. The reader 20 is configured to move in the sub-scanning direction SD while the home position HP is used as a base position. In this embodiment, when light enters from outside of the image scanner SM in a state where the document cover CV is in an open state and where the reader 20 is located at the home position HP, the reader 20 does not read the light from outside of the image scanner SM.

<Electrical Configuration of Image Scanner SM>

Figure 3:
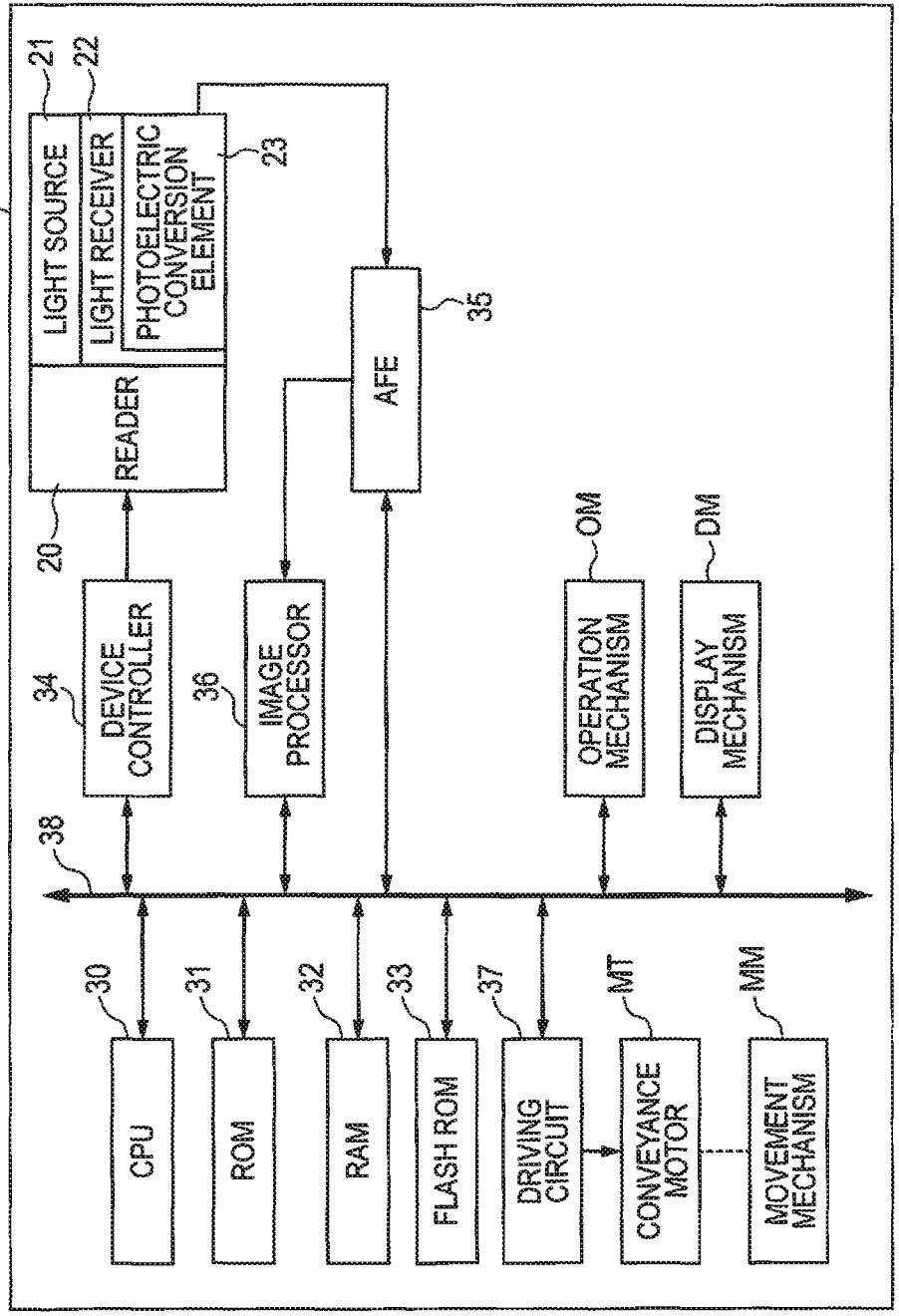
FIG. 3 is a block diagram showing the electrical configuration of the image scanner SM.

The electrical configuration of the image scanner SM will be described with reference to FIGS. 3, 4, and 5. Referring to FIG. 3, the image scanner SM includes, as main constituent elements, a CPU 30, a ROM 31, a RAM 32, a flash ROM 33, a device controller 34, an analog front end (hereinafter referred to as an AFE) 35, an image processor 36, and a driving circuit 37. These constituent elements are connected to an operation mechanism OM and a display mechanism DM through a bus 38. The operation mechanism OM is constituted by a plurality of keys such as a start button and a determination (enter) button. A user operates the operation mechanism OM to input various instructions to the image scanner SM. The display mechanism DM is a display for displaying various types of information.

The ROM 31 stores programs for allowing the image scanner SM to execute various operations such as reading main processing (to be described later) and sub-routine processing in each main processing. The CPU 30 controls the respective units in accordance with programs read out from the ROM 31. The flash ROM 33 is a reprogrammable nonvolatile memory, and stores various data generated by control processing by the CPU 30, various types of data acquired by, for example, the reading main processing. The RAM 32 temporarily stores, for example, the calculation results generated by control processing by the CPU 30.

The device controller 34 is connected to the reader 20, and transmits various signals based on instructions from the CPU 30. Specifically, based on instructions from the CPU 30, the device controller 34 transmits, to the light source 21, a signal for controlling turn-on or turn-off of the light source 21 and a signal for controlling a current value flowing in the light source 21. Based on instructions from the CPU 30, the device controller 34 transmits, to the light receiver 22, a serial-in signal SI for simultaneously transferring electrical signals from a large number of photoelectric conversion elements 23 to an analog shift register (not shown) and a clock signal CLK for sequentially outputting electrical signals from the analog shift register. Upon receiving these signals from the device controller 34, the reader 20 turns on the light source 21 and transmits, to the AFE 35, analog signals corresponding to the amounts of light received by the light receiver 22 in the order from the leading pixel to the final pixel.

The AFE 35 is connected to the reader 20, and converts an analog signal transmitted from the reader 20 into digital data DD based on an instruction from the CPU 30. The AFE 35 has a particular input range and resolution. For example, if the resolution is 10 bits, the resolution corresponds to gradations from "0" to "1023". In this case, the AFE 35 converts an analog signal transmitted from the reader 20 into gradation data of 10 bits (0 to 1023) as the digital data DD. The digital data converted by the AFE 35 is transmitted to the image processor 36 and stored in the RAM 32.

The driving circuit 37 is connected to a conveyance motor MT, and drives the conveyance motor MT based on a drive command transmitted from the CPU 30. The driving circuit 37 rotates the conveyance motor MT in accordance with a rotation amount and a rotation direction commanded by the drive command. When the conveyance motor MT rotates by a particular amount, a movement mechanism MM rotates by a particular angle to convey the reader 20 by a particular distance in the sub-scanning direction SD.

Figure 4:
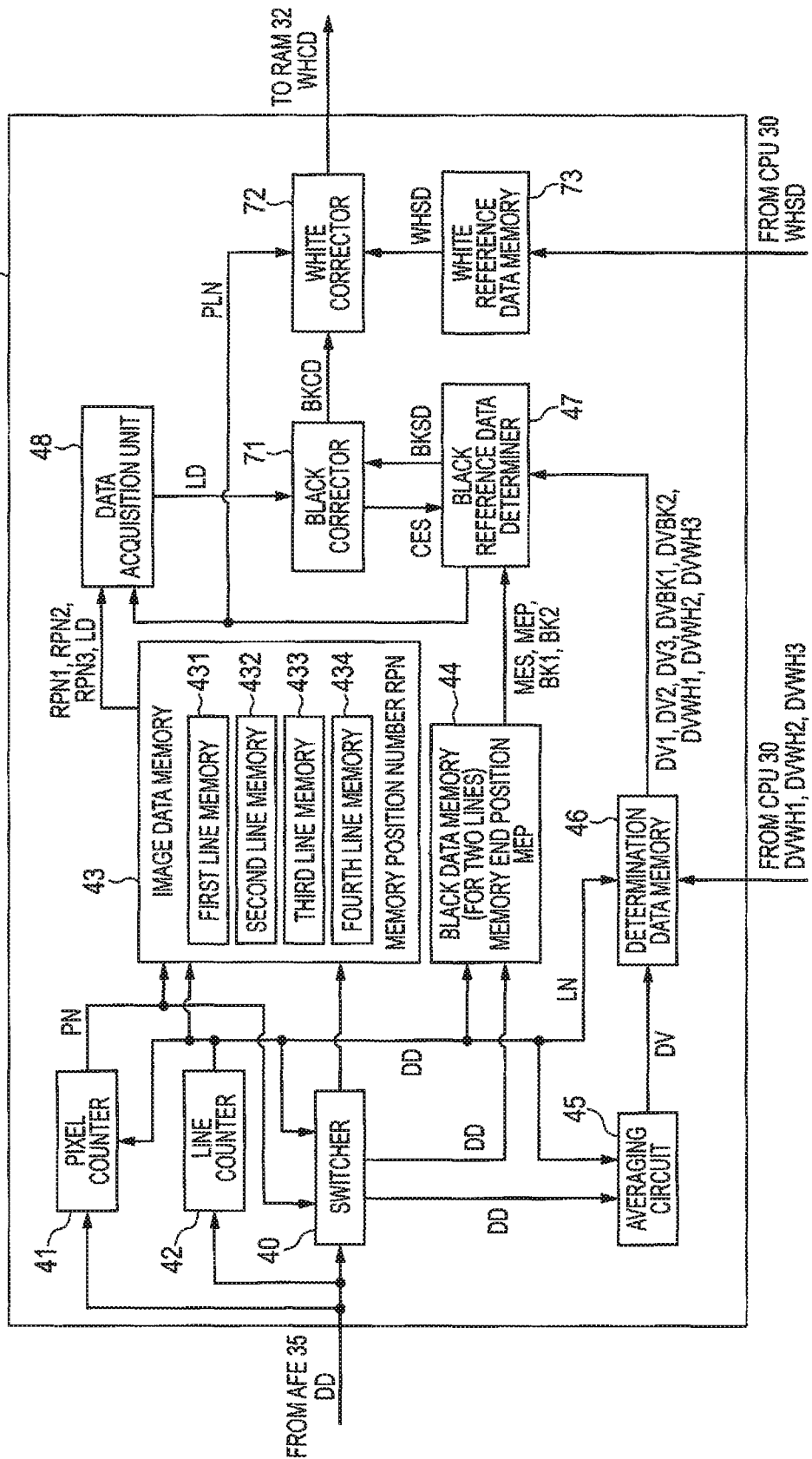
FIG. 4 is a block diagram showing the electrical configuration of an image processor 36.

As shown in FIG. 4, the image processor 36 includes a switcher 40, a pixel counter 41, a line counter 42, an image data memory 43, a black data memory 44, an averaging circuit 45, a determination data memory 46, a black reference data determiner 47, a data acquisition unit 48, a black corrector 71, a white corrector 72, and a white reference data memory 73. The image data memory 43 includes a first line memory 431, a second line memory 432, a third line memory 433, and a fourth line memory 434.

In response to input of digital data DD from the AFE 35, the pixel counter 41 adds "1" to a pixel number PN that is set, and transmits the incremented pixel number PN to the switcher 40 and the image data memory 43. In response to input of a line number LN from the line counter 42, the pixel counter 41 sets the pixel number PN to "0". In this embodiment, "0" is set to the pixel number PN as an initial value in initial value setting processing RA1 described later.

In response to input of 2600 pieces of the digital data DD from the AFE 35 when the line number LN is set to "1", "2", or "3", the line counter 42 adds "1" to the line number LN that is set, and transmits the incremented line number LN to the pixel counter 41, the switcher 40, the image data memory 43, the determination data memory 46, and the black data memory 44. In response to input of 2600 pieces of the digital data DD from the AFE 35 when the line number LN is set to "4", the line counter 42 sets the line number LN to "1" and transmits the set line number LN to the pixel counter 41, the switcher 40, the image data memory 43, the determination data memory 46, and the black data memory 44. In this embodiment, in the initial value setting processing RA1 described later, the line number LN is set to "1" as an initial value, the line counter 42 transmits the set line number LN to the pixel counter 41, the switcher 40, the image data memory 43, the determination data memory 46, and the black data memory 44. In this embodiment, when 2600 pieces of the digital data DD are inputted from the AFE 35, the digital data DD from a leading pixel to a final pixel of one line are inputted.

In response to input of the digital data DD from the AFE 35 when the line number LN inputted from the line counter 42 is "1", the switcher 40 transmits the inputted digital data DD to the black data memory 44. In response to input of the digital data DD from the AFE 35 when the line number LN inputted from the line counter 42 is "2", "3", or "4", the switcher 40 transmits the inputted digital data DD to the image data memory 43. In response to input of the pixel number PN of any one of "2591" to "2600" from the pixel counter 41, the switcher 40 transmits the digital data DD inputted from the AFE 35 to the averaging circuit 45. That is, the switcher 40 transmits the digital data DD of the 2591st pixel to the 2600th pixel to the averaging circuit 45.

In response to input of the digital data DD from the switcher 40 when a stored memory position number RPN is "4", the image data memory 43 stores the digital data DD in the first line memory 431 in association with the pixel number PN inputted from the pixel counter 41. When the digital data DD is stored in the first line memory 431 in association with "2600" that is the pixel number PN of the final pixel, the image data memory 43 sets the memory position number RPN to "1". In response to input of the digital data DD from the switcher 40 when the stored memory position number RPN is "1", the image data memory 43 stores the digital data DD in the second line memory 432 in association with the pixel number PN inputted from the pixel counter 41. When the digital data DD is stored in the second line memory 432 in association with "2600" that is the pixel number PN of the final pixel, the image data memory 43 sets the memory position number RPN to "2". In response to input of the digital data DD from the switcher 40 when the stored memory position number RPN is "2", the image data memory 43 stores the digital data DD in the third line memory 433 in association with the pixel number PN inputted from the pixel counter 41. When the digital data DD is stored in the third line memory 433 in association with "2600" that is the pixel number PN of the final pixel, the image data memory 43 sets the memory position number RPN to "3". In response to input of the digital data DD from the switcher 40 when the stored memory position number RPN is "3", the image data memory 43 stores the digital data DD in the fourth line memory 434 in association with the pixel number PN inputted from the pixel counter 41. When the digital data DD is stored in the fourth line memory 434 in association with "2600" that is the pixel number PN of the final pixel, the image data memory 43 sets the memory position number RPN to "4". In response to input of "3" as the line number LN from the line counter 42, the image data memory 43 stores the stored memory position number RPN as a first memory position RPN1. In response to input of "4" as the line number LN from the line counter 42, the image data memory 43 stores the stored memory position number RPN as a second memory position RPN2. In response to input of "1" as the line number LN from the line counter 42, the image data memory 43 stores the stored memory position number RPN as a third memory position RPN3. In this embodiment, the line number LN is inputted to the image data memory 43 in a period from when the pixel number PN of "2600" is inputted until when the pixel number PN of "1" is inputted. In this embodiment, in the initial value setting processing RA1 described later, the memory position number RPN is set to "4" as an initial value.

The black data memory 44 includes a ring buffer configured to store 5200 pieces of the digital data DD. In response to input of the digital data DD, the black data memory 44 stores the digital data DD in the ring buffer in a predetermined memory order. In response to input of the line number LN of "2" from the line counter 42 in a state where 5200 pieces of the digital data DD are stored in the ring buffer, the black data memory 44 stores, as a memory end position MEP, a memory position at which the digital data DD is stored the last time in the ring buffer, and transmits a memory end signal MES to the black reference data determiner 47. In this embodiment, the 5200 pieces of the digital data DD are the digital data DD from the leading pixel to the final pixel of two lines. The memory end position MEP is a position at which first black data BK1 of the final pixel is stored. The first black data BK1 is data from the digital data DD that is stored at the 2599th position counted from the memory end position MEP in the opposite direction of a memory order in which the black data memory 44 stores, to the digital data DD stored at the memory end position MEP. The second black data BK2 is data from the digital data DD that is stored at the 5199th position counted from the memory end position MEP in the opposite direction of the memory order, to the digital data DD that is stored at the 2600th position counted from the memory end position MEP in the opposite direction of the memory order.

In response to input of the line number LN from the line counter 42, the averaging circuit 45 averages 10 pieces of the digital data DD inputted from the switcher 40, and transmits the average value to the determination data memory 46 as a determination value DV.

In response to input of the determination value DV in a state where a first black determination value DVBK1 is not stored and the line number LN inputted from the line counter 42 is "2", the determination data memory 46 stores the inputted determination value DV as the first black determination value DVBK1. In response to input of the determination value DV in a state where the first black determination value DVBK1 is stored and the line number LN inputted from the line counter 42 is "2", the determination data memory 46 stores the already-stored first black determination value DVBK1 as a second black determination value DVBK2, and stores the inputted determination value DV as the first black determination value DVBK1. In response to input of the determination value DV when the line number LN inputted from the line counter 42 is "3", the determination data memory 46 stores the inputted determination value DV as the first determination value DV1. In response to input of the determination value DV when the line number LN inputted from the line counter 42 is "4", the determination data memory 46 stores the inputted determination value DV as the second determination value DV2. In response to input of the determination value DV when the line number LN inputted from the line counter 42 is "1", the determination data memory 46 stores the inputted determination value DV as the third determination value DV3. In response to input, from the CPU 30, of a first white determination value DVWH1 calculated in processing RA5 described later, the determination data memory 46 stores the first white determination value DVWH1. In response to input, from the CPU 30, of a second white determination value DVWH2 calculated in processing RA6 described later, the determination data memory 46 stores the second white determination value DVWH2. In response to input, from the CPU 30, of a third white determination value DVWH3 calculated in processing RA7 described later, the determination data memory 46 stores the third white determination value DVWH3.

Figure 5:
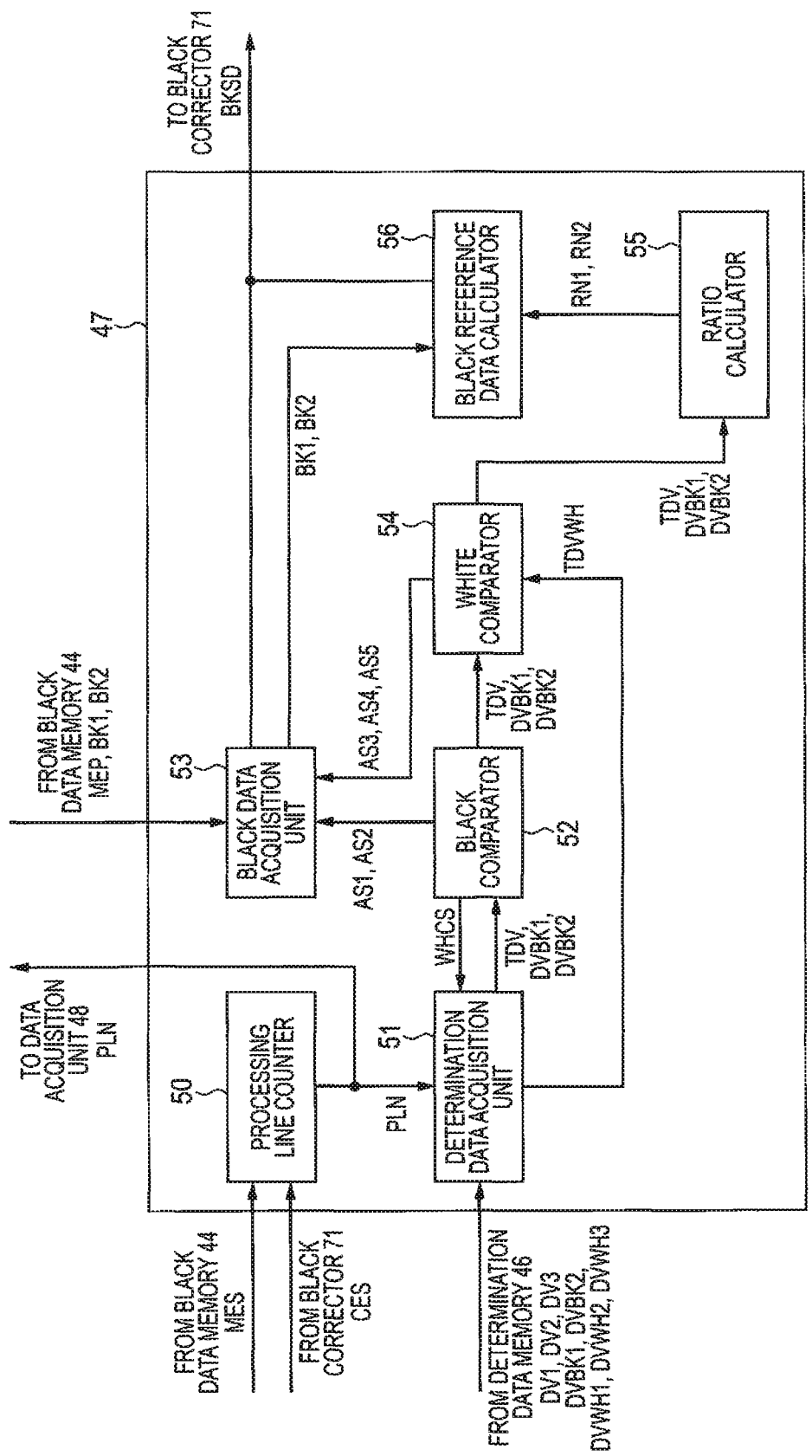
FIG. 5 is a block diagram showing the electrical configuration of a black reference data determiner 47.

As shown in FIG. 5, the black reference data determiner 47 includes a processing line counter 50, a determination data acquisition unit 51, a black comparator 52, a black data acquisition unit 53, a white comparator 54, a ratio calculator 55, and a black reference data calculator 56.

In response to input of the memory end signal MES from the black data memory 44, the processing line counter 50 sets a processing line number PLN to "1", and transmits the set processing line number PLN to the determination data acquisition unit 51, the white corrector 72, and the data acquisition unit 48. In response to input of a correction end signal CES from the black corrector 71 when the processing line number PLN is "1", the processing line counter 50 sets the processing line number PLN to "2", and transmits the set processing line number PLN to the determination data acquisition unit 51, the white corrector 72, and the data acquisition unit 48. In response to input of the correction end signal CES from the black corrector 71 when the processing line number PLN is "2", the processing line counter 50 sets the processing line number PLN to "3", and transmits the set processing line number PLN to the determination data acquisition unit 51, the white corrector 72, and the data acquisition unit 48. In this embodiment, a period from when the processing line number PLN is transmitted from the processing line counter 50 until when the correction end signal CES is inputted to the processing line counter 50 is shorter than a period in which the digital data DD of one line is inputted from the AFE 35 to the image processor 36.

In response to input of "1" as the processing line number PLN from the processing line counter 50, the determination data acquisition unit 51 acquires the first determination value DV1, the first black determination value DVBK1, and the second black determination value DVBK2 from the determination data memory 46, transmits the acquired first determination value DV1 to the black comparator 52 as a target determination value TDV, and transmits the acquired first black determination value DVBK1 and second black determination value DVBK2 to the black comparator 52. In response to input of "2" as the processing line number PLN from the processing line counter 50, the determination data acquisition unit 51 acquires the second determination value DV2, the first black determination value DVBK1, and the second black determination value DVBK2 from the determination data memory 46, transmits the acquired second determination value DV2 to the black comparator 52 as the target determination value TDV, and transmits the acquired first black determination value DVBK1 and second black determination value DVBK2 to the black comparator 52. In response to input of "3" as the processing line number PLN from the processing line counter 50, the determination data acquisition unit 51 acquires the third determination value DV3, the first black determination value DVBK1, and the second black determination value DVBK2 from the determination data memory 46, transmits the acquired third determination value DV3 to the black comparator 52 as the target determination value TDV, and transmits the acquired first black determination value DVBK1 and second black determination value DVBK2 to the black comparator 52. In response to input of a white comparison signal WHCS from the black comparator 52 described later when the inputted processing line number PLN is "1", the determination data acquisition unit 51 acquires the first white determination value DVWH1 from the determination data memory 46, and transmits the acquired first white determination value DVWH1 to the white comparator 54 as a target white determination value TDVWH. In response to input of the white comparison signal WHCS from the black comparator 52 described later when the inputted processing line number PLN is "2", the determination data acquisition unit 51 acquires the second white determination value DVWH2 from the determination data memory 46, and transmits the acquired second white determination value DVWH2 to the white comparator 54 as the target white determination value TDVWH. In response to input of the white comparison signal WHCS from the black comparator 52 described later when the inputted processing line number PLN is "3", the determination data acquisition unit 51 acquires the third white determination value DVWH3 from the determination data memory 46, and transmits the acquired third white determination value DVWH3 to the white comparator 54 as the target white determination value TDVWH.

In response to input of the target determination value TDV, the first black determination value DVBK1, and the second black determination value DVBK2, the black comparator 52 determines whether the target determination value TDV is equal to the first black determination value DVBK1, the target determination value TDV is equal to the second black determination value DVBK2, or the target determination value TDV is not equal to any one of the first black determination value DVBK1 and the second black determination value DVBK2. In response to determining that the target determination value TDV is equal to the first black determination value DVBK1, the black comparator 52 transmits a first acquisition signal AS1 to the black data acquisition unit 53. In response to determining that the target determination value TDV is equal to the second black determination value DVBK2, the black comparator 52 transmits a second acquisition signal AS2 to the black data acquisition unit 53. In response to determining that the target determination value TDV is not equal to any one of the first black determination value DVBK1 and the second black determination value DVBK2, the black comparator 52 transmits the white comparison signal WHCS to the determination data acquisition unit 51, and transmits the target determination value TDV, the first black determination value DVBK1, and the second black determination value DVBK2 to the white comparator 54.

In response to input of the target white determination value TDVWH, the white comparator 54 determines whether the target determination value TDV inputted from the black comparator 52 is larger than the target white determination value TDVWH. In response to determining that the target determination value TDV is larger than the target white determination value TDVWH, the white comparator 54 determines whether the first black determination value DVBK1 is smaller than or equal to the second black determination value DVBK2. In response to determining that the first black determination value DVBK1 is smaller than or equal to the second black determination value DVBK2, the white comparator 54 transmits a third acquisition signal AS3 to the black data acquisition unit 53. In response to determining that the first black determination value DVBK1 is not smaller than or equal to (that is, larger than) the second black determination value DVBK2, the white comparator 54 transmits a fourth acquisition signal AS4 to the black data acquisition unit 53. In response to determining that the target determination value TDV is not larger than the target white determination value TDVWH, the white comparator 54 transmits a fifth acquisition signal AS5 to the black data acquisition unit 53, and transmits the target determination value TDV, the first black determination value DVBK1, and the second black determination value DVBK2 to the ratio calculator 55.

In response to input of the first acquisition signal AS1 from the black comparator 52, the black data acquisition unit 53 acquires the memory end position MEP from the black data memory 44, acquires the first black data BK1 based on the acquired memory end position MEP, and transmits the acquired first black data BK1 to the black corrector 71 as black reference data BKSD. In response to input of the second acquisition signal AS2 from the black comparator 52, the black data acquisition unit 53 acquires the memory end position MEP from the black data memory 44, acquires the second black data BK2 based on the acquired memory end position MEP, and transmits the acquired second black data BK2 to the black corrector 71 as the black reference data BKSD. In response to input of the third acquisition signal AS3 from the white comparator 54, the black data acquisition unit 53 acquires the memory end position MEP from the black data memory 44, acquires the first black data BK1 based on the acquired memory end position MEP, and transmits the acquired first black data BK1 to the black corrector 71 as the black reference data BKSD. In response to input of the fourth acquisition signal AS4 from the white comparator 54, the black data acquisition unit 53 acquires the memory end position MEP from the black data memory 44, acquires the second black data BK2 based on the acquired memory end position MEP, and transmits the acquired second black data BK2 to the black corrector 71 as the black reference data BKSD. In response to input of the fifth acquisition signal AS5 from the white comparator 54, the black data acquisition unit 53 acquires the memory end position MEP from the black data memory 44, acquires the first black data BK1 and the second black data BK2 based on the acquired memory end position MEP, and transmits the acquired first black data BK1 and second black data BK2 to the black reference data calculator 56.

In response to input of the target determination value TDV, the first black determination value DVBK1, and the second black determination value DVBK2 from the white comparator 54, the ratio calculator 55 calculates a first ratio RN1 and a second ratio RN2 by linear interpolation processing, and transmits the calculated first ratio RN1 and second ratio RN2 to the black reference data calculator 56. Specifically, the ratio calculator 55 calculates, as the first ratio RN1, a value that is obtained by dividing a difference between the second black determination value DVBK2 and the target determination value TDV by a difference between the first black determination value DVBK1 and the second black determination value DVBK2. Further, the ratio calculator 55 calculates, as the second ratio RN2, a value that is obtained by dividing a difference between the first black determination value DVBK1 and the target determination value TDV by the difference between the first black determination value DVBK1 and the second black determination value DVBK2.

In response to input of the first ratio RN1 and the second ratio RN2 from the ratio calculator 55, the black reference data calculator 56 adds the first black data BK1 multiplied by the first ratio RN1 to the second black data BK2 multiplied by the second ratio RN2 in each pixel from the leading pixel to the final pixel, and transmits, to the black corrector 71, the added value for each pixel from the leading pixel to the final pixel as the black reference data BKSD.

As shown in FIG. 4, in response to input of "1" as the processing line number PLN from the black reference data determiner 47, the data acquisition unit 48 acquires the first memory position RPN1 from the image data memory 43, acquires, as line data LD, the digital data DD stored in the line memory corresponding to the acquired first memory position RPN1, and transmits the acquired line data LD to the black corrector 71. The line memory corresponding to the first memory position RPN1 is the first line memory 431, the second line memory 432, the third line memory 433, and the fourth line memory 434 when the first memory position RPN1 is "1", "2", "3", and "4", respectively. In response to input of "2" as the processing line number PLN from the black reference data determiner 47, the data acquisition unit 48 acquires the second memory position RPN2 from the image data memory 43, acquires, as the line data LD, the digital data DD stored in the line memory corresponding to the acquired second memory position RPN2, and transmits the acquired line data LD to the black corrector 71. The line memory corresponding to the second memory position RPN2 is the first line memory 431, the second line memory 432, the third line memory 433, and the fourth line memory 434 when the second memory position RPN2 is "1", "2", "3", and "4", respectively. In response to input of "3" as the processing line number PLN from the black reference data determiner 47, the data acquisition unit 48 acquires the third memory position RPN3 from the image data memory 43, acquires, as the line data LD, the digital data DD stored in the line memory corresponding to the acquired third memory position RPN3, and transmits the acquired line data LD to the black corrector 71. The line memory corresponding to the third memory position RPN3 is the first line memory 431, the second line memory 432, the third line memory 433, and the fourth line memory 434 when the third memory position RPN3 is "1", "2", "3", and "4", respectively.

In response to input of the black reference data BKSD from the black reference data determiner 47, the black corrector 71 calculates black correction data BKCD by subtracting the black reference data BKSD from the line data LD for each pixel in one line, transmits the calculated black correction data BKCD to the white corrector 72, and transmits the correction end signal CES to the black reference data determiner 47. Subtracting the black reference data BKSD from the line data LD for each pixel in one line is an example of black correction processing.

In response to input, from the CPU 30, of white reference data WHSD of three colors calculated in processing RA4 described later, the white reference data memory 73 stores the white reference data WHSD of three colors.

In response to input of the black correction data BKCD from the black corrector 71 when the processing line number PLN is "1", the white corrector 72 acquires the white reference data WHSD of red from the white reference data memory 73. In response to input of the black correction data BKCD from the black corrector 71 when the processing line number PLN is "2", the white corrector 72 acquires the white reference data WHSD of green from the white reference data memory 73. In response to input of the black correction data BKCD from the black corrector 71 when the processing line number PLN is "3", the white corrector 72 acquires the white reference data WHSD of blue from the white reference data memory 73. In response to acquisition of the white reference data WHSD, the white corrector 72 calculates white correction data WHCD of three colors by multiplying target data by a value obtained by dividing the black correction data BKCD by the acquired white reference data WHSD for each pixel of each color in one line, and stores the calculated white correction data WHCD of three colors in the RAM 32. In this embodiment, the target data is a value that is normalized when a white color is read, and is "255", for example.

<Operation of Image Scanner SM>

Next, the operation of the image scanner SM will be described with reference to the accompanying drawings. The image scanner SM mainly executes reading main processing of reading the original document GS. Processing R1 to processing R8 in the reading main processing shown in FIG. 6 are executed by the CPU 30.

<Reading Main Processing>

Figure 6:
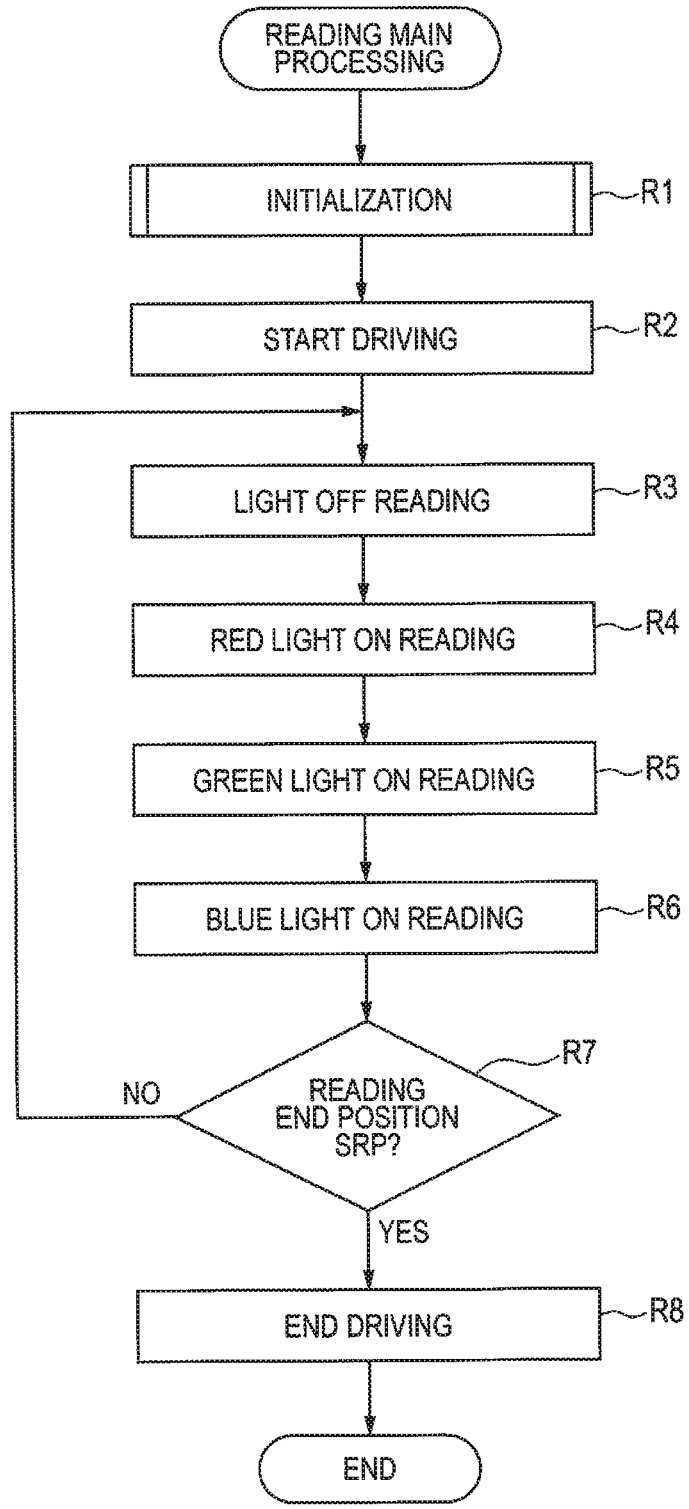
FIG. 6 is a flowchart showing reading main processing.

The reading main processing shown in FIG. 6 is started by a user by placing the original document GS on the transparent plate TP and pressing a reading start button of the operation mechanism OM. That is, the CPU 30 starts the reading main processing by receiving a pressing command of the reading start button.

The CPU 30 executes initialization processing (R1). Details of this processing will be described later and an outline of the processing will be described below. The CPU 30 sets initial values in the device controller 34, the AFE, 35, and the image processor 36. The CPU 30 acquires black data BKD and white data WHD. The CPU 30 calculates the white reference data WHSD, the first white determination value DVWH1, the second white determination value DVWH2, and the third white determination value DVWH3.

The CPU 30 starts a driving operation (R2). Specifically, the CPU 30 transmits a drive command to the driving circuit 37 to move the reader 20 to the reference position BP. The CPU 30 transmits commands to the driving circuit 37 to start the driving operation of moving the reader 20 from the reference position BP to a downstream position along the sub-scanning direction SD.

The CPU 30 executes light off reading processing (R3). Specifically, the CPU 30 controls the light source 21 to turn off and controls the reader 20 to read an image of one line. When the processing R3 is executed, the digital data DD of one line is transmitted from the AFE 35 to the image processor 36, "1" as the line number LN is transmitted from the line counter 42, and the digital data DD of one line is stored in the black data memory 44 by the switcher 40.

The CPU 30 executes red light on reading processing (R4). Specifically, the CPU 30 controls the light source 21 to emit red light and controls the reader 20 to read an image of one line. When the processing R4 is executed, the digital data DD of one line is transmitted from the AFE 35 to the image processor 36, "2" as the line number LN is transmitted from the line counter 42, and the digital data DD of one line is stored in the image data memory 43 by the switcher 40.

The CPU 30 executes green light on reading processing (R5). Specifically, the CPU 30 controls the light source 21 to emit green light and controls the reader 20 to read an image of one line. When the processing R5 is executed, the digital data DD of one line is transmitted from the AFE 35 to the image processor 36, "3" as the line number LN is transmitted from the line counter 42, and the digital data DD of one line is stored in the image data memory 43 by the switcher 40.

The CPU 30 executes blue light on reading processing (R6). Specifically, the CPU 30 controls the light source 21 to emit blue light and controls the reader 20 to read an image of one line. When the processing R6 is executed, the digital data DD of one line is transmitted from the AFE 35 to the image processor 36, "4" as the line number LN is transmitted from the line counter 42, and the digital data DD of one line is stored in the image data memory 43 by the switcher 40.

The CPU 30 determines whether the reader 20 is located at the reading end position SRP (R7). When the reader 20 is located at the reading end position SRP (R7: Yes), the CPU 30 advances the processing to the processing R8. When the reader 20 is not located at the reading end position SRP (R7: No), the CPU 30 returns the processing to the processing R3. In this embodiment, when one cycle from the processing R3 to the processing R7 is executed, the reader 20 moves in the sub-scanning direction SD by a distance corresponding to a reading resolution in the sub-scanning direction SD.

The CPU 30 ends the driving operation (R8). Specifically, the CPU 30 transmits a command to the driving circuit 37 to stop driving of the reader 20, and thereafter controls the reader 20 to move to the home position HP. Upon completing the processing R8, the reading main processing ends.

<Initialization Processing R1>

Figure 7:
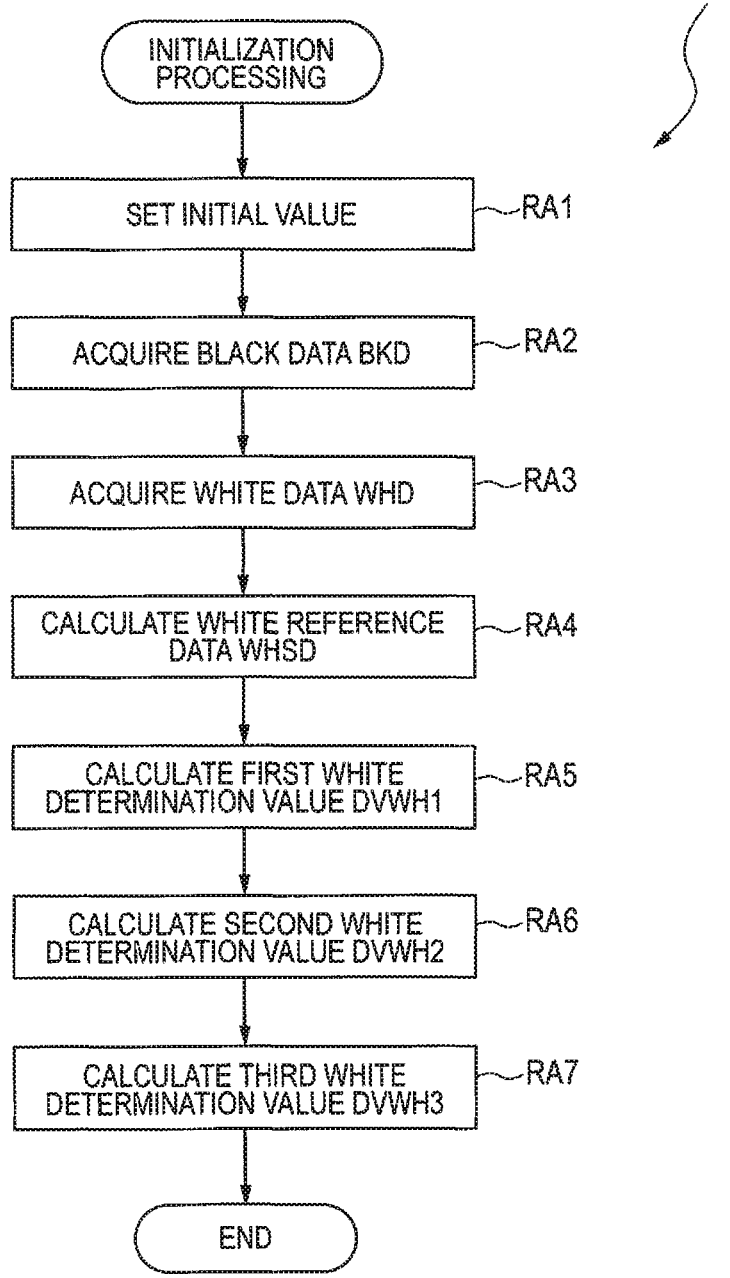
FIG. 7 is a flowchart showing initialization processing R1.

Upon starting the initialization processing (R1) shown in FIG. 7, the CPU 30 sets initial values to the device controller 34, the AFE 35, and the image processor 36 (RA1). Specifically, the CPU 30 acquires, from the flash ROM 33, the setting values of the clock signal CLK and the serial-in signal SI for reading with a reading resolution of 300 DPI in the main scanning direction MD and a reading resolution of 300 DPI in the sub-scanning direction SD, and sets the acquired values to the device controller 34. The CPU 30 acquires, from the flash ROM 33, setting values for reading with a reading resolution of 300 DPI in the main scanning direction MD and a reading resolution of 300 DPI in the sub-scanning direction SD, and sets the acquired values to the AFE 35. The CPU 30 sets the pixel counter 41 in the image processor 36 to "0" as the pixel number PN. The CPU 30 sets the line counter 42 in the image processor 36 to "1" as the line number LN. The CPU 30 deletes the first black determination value DVBK1 in the determination data memory 46 in the image processor 36. The CPU 30 sets the image data memory 43 in the image processor 36 to "4" as the memory position number RPN. The CPU 30 transmits a drive command to move the reader 20 to the home position HP.

The CPU 30 acquires black data BKD (RA2). Specifically, the CPU 30 acquires, as the black data BKD of one line, the digital data DD of one line that is obtained by converting, with the AFE 35, an analog data that is read by the reader 20 in a state where the light source 21 is turned off. In this embodiment, the digital data DD of one line converted in the processing RA2 is not transmitted to the image processor 36.

The CPU 30 acquires white data WHD (RA3). Specifically, the CPU 30 acquires, as the white data WHD of red, the digital data DD of one line that is obtained by converting, with the AFE 35, an analog data that is obtained when red light of the light source 21 is emitted to the reference member BM and the reflection light is read by the reader 20. The CPU 30 acquires, as the white data WHD of green, the digital data DD of one line that is obtained by converting, with the AFE 35, an analog data that is obtained when green light of the light source 21 is emitted to the reference member BM and the reflection light is read by the reader 20. The CPU 30 acquires, as the white data WHD of blue, the digital data DD of one line that is obtained by converting, with the AFE 35, an analog data that is obtained when blue light of the light source 21 is emitted to the reference member BM and the reflection light is read by the reader 20. In this embodiment, the white data WHD of red, the white data WHD of green, and the white data WHD of blue are combined to form the white data WHD of three colors of one line. In this embodiment, the digital data DD of one line converted in the processing RA3 is not transmitted to the image processor 36.

The CPU 30 calculates the white reference data WHSD (RA4). Specifically, the CPU 30 calculates the white reference data WHSD of three colors by subtracting the black data BKD from the white data WHD in each pixel of each color in one line. The CPU 30 transmits the calculated white reference data WHSD of three colors to the white reference data memory 73.

The CPU 30 calculates the first white determination value DVWH1 (RA5). Specifically, the CPU 30 calculates the first white determination value DVWH1 by averaging the white data WHD of red of ten pixels from the 2591st pixel to 2600th pixel and multiplying the average value by a first particular value. The CPU 30 transmits the calculated first white determination value DVWH1 to the determination data memory 46. In this embodiment, the first white determination value DVWH1 is calculated by reading an image of white color of the reference member BM. On the other hand, the target determination value TDV is calculated by reading an image of white color of the document cover CV when the document cover CV is in a closed state. For example, the first particular value is "0.9" in view of a difference between the white color of the reference member BM and the white color of the document cover CV.

The CPU 30 calculates the second white determination value DVWH2 (RA6). Specifically, the CPU 30 calculates the second white determination value DVWH2 by averaging the white data WHD of green of ten pixels from the 2591st pixel to 2600th pixel and multiplying the average value by a second particular value. The CPU 30 transmits the calculated second white determination value DVWH2 to the determination data memory 46. In this embodiment, the second white determination value DVWH2 is calculated by reading an image of white color of the reference member BM. On the other hand, the target determination value TDV is calculated by reading an image of white color of the document cover CV when the document cover CV is in a closed state. For example, the second particular value is "0.9" in view of a difference between the white color of the reference member BM and the white color of the document cover CV.

The CPU 30 calculates the third white determination value DVWH3 (RA7). Specifically, the CPU 30 calculates the third white determination value DVWH3 by averaging the white data WHD of blue of ten pixels from the 2591st pixel to 2600th pixel and multiplying the average value by a third particular value. The CPU 30 transmits the calculated third white determination value DVWH3 to the determination data memory 46. In this embodiment, the third white determination value DVWH3 is calculated by reading an image of white color of the reference member BM. On the other hand, the target determination value TDV is calculated by reading an image of white color of the document cover CV when the document cover CV is in a closed state. For example, the third particular value is "0.9" in view of a difference between the white color of the reference member BM and the white color of the document cover CV. Upon completing the processing RA7, the processing R1 ends.

SPECIFIC EXAMPLE

A process of determining the black reference data BKSD will be described while referring to FIG. 8. In this specific example, a process is described in which the image scanner SM reads a first line of an image on the original document GS. In this specific example, a case is described in which a user moves the document cover CV from the open state to the closed state when an image on the original document GS at a first line green position is being read. In this specific example, by the initialization processing R1 that is executed preliminarily, the determination data memory 46 stores "700" as the second white determination value DVWH2 and "550" as the third white determination value DVWH3.

In the image scanner SM, by reading an image on the original document GS at a first line light off position in a state where the light source 21 is turned off in the light off reading processing R3, the digital data DD of one line is stored in the black data memory 44 as the second black data BK2, and an average "400" of the digital data DD from the 2591st pixel to the 2600th pixel is stored in the determination data memory 46 as the second black determination value DVBK2. In this processing, actually, the digital data DD is stored as the first black data BK1, and then the digital data DD is stored as the second black data BK2. For simplicity, however, it is described that the digital data DD is stored as the second black data BK2.

In the image scanner SM, by reading an image on the original document GS at a first line red position in a state where red light is emitted from the light source 21 in the red light on reading processing R4, the digital data DD of one line is stored in the first line memory 431 as the line data LD, and an average "400" of the digital data DD from the 2591st pixel to the 2600th pixel is stored in the determination data memory 46 as the first determination value DV1. In this specific example, the document cover CV is in an open state both when the image on the original document GS at the first line light off position is being read and when the image on the original document GS at the first line red position is being read. Thus, because the same light amount of outside light enters the reader 20 at the both times, the second black determination value DVBK2 and the first determination value DV1 have the same value.

In the image scanner SM, by reading an image on the original document GS at a first line green position in a state where green light is emitted from the light source 21 in the green light on reading processing R5, the digital data DD of one line is stored in the second line memory 432 as the line data LD, and an average "160" of the digital data DD from the 2591st pixel to the 2600th pixel is stored in the determination data memory 46 as the second determination value DV2. In this specific example, the document cover CV moves from the open state to the closed state when the image on the original document GS at the first line green position is being read. Thus, the second determination value DV2 is smaller than the first determination value DV1.

In the image scanner SM, by reading an image on the original document GS at a first line blue position in a state where blue light is emitted from the light source 21 in the blue light on reading processing R6, the digital data DD of one line is stored in the third line memory 433 as the line data LD, and an average "600" of the digital data DD from the 2591st pixel to the 2600th pixel is stored in the determination data memory 46 as the third determination value DV3. In this specific example, the document cover CV is in the closed state when the image on the original document GS at the first line blue position is being read. Thus, because the reader 20 reads an image of the white color of the document cover CV, the third determination value DV3 is a large value.

In the image scanner SM, by reading an image on the original document GS at a second line light off position in a state where the light source 21 is turned off in the light off reading processing R3, the digital data DD of one line is stored in the black data memory 44 as the first black data BK1, and an average "40" of the digital data DD from the 2591st pixel to the 2600th pixel is stored in the determination data memory 46 as the first black determination value DVBK1. In this specific example, the document cover CV is in the closed state when the image on the original document GS at the second line light off position is being read. Thus, the first black determination value DVBK1 has a small value.

In the image scanner SM, when the image on the original document GS at a second line red position is being read, the black data memory 44 transmits the memory end signal MES to the black reference data determiner 47. In response to input of the memory end signal MES, the processing line counter 50 transmits "1" as the processing line number PLN to the determination data acquisition unit 51, the data acquisition unit 48, and the white corrector 72. In response to input of "1" as the processing line number PLN, the determination data acquisition unit 51 acquires the first determination value DV1 of "400" as the target determination value TDV, and acquires the first black determination value DVBK1 of "40" and the second black determination value DVBK2 of "400". The black comparator 52 determines that the target determination value TDV of "400" is equal to the second black determination value DVBK2 of "400", and transmits the second acquisition signal AS2 to the black data acquisition unit 53. In response to input of the second acquisition signal AS2, the black data acquisition unit 53 transmits the second black data BK2 to the black corrector 71 as the black reference data BKSD. In response to input of "1" as the processing line number PLN, the data acquisition unit 48 acquires the line data LD in the first line memory 431 and transmits the acquired line data LD to the black corrector 71. The black corrector 71 calculates the black correction data BKCD by subtracting the black reference data BKSD from the inputted line data LD, and transmits the correction end signal CES to the black reference data determiner 47.

In response to input of the correction end signal CES when the processing line number PLN is "1", the processing line counter 50 transmits "2" as the processing line number PLN to the determination data acquisition unit 51, the data acquisition unit 48, and the white corrector 72. In response to input of "2" as the processing line number PLN, the determination data acquisition unit 51 acquires "160" of the second determination value DV2 as the target determination value TDV, and acquires "40" that is the first black determination value DVBK1 and "400" that is the second black determination value DVBK2. The black comparator 52 determines that "160" of the target determination value TDV is not equal to any one of "40" that is the first black data BK1 and "400" that is the second black data BK2, and transmits the white comparison signal WHCS to the determination data acquisition unit 51. The determination data acquisition unit 51 transmits "700" of the second white determination value DVWH2 to the white comparator 54 as the target white determination value TDVWH. The white comparator 54 determines that "160" of the target determination value TDV is not larger than "700" of the target white determination value TDVWH, and transmits the fifth acquisition signal AS5 to the black data acquisition unit 53. The ratio calculator 55 obtains "0.667" as the first ratio RN1 by dividing the difference "240" between the second black determination value DVB K2 and the target determination value TDV by the difference "360" between the first black determination value DVBK1 and the second black determination value DVBK2. The ratio calculator 55 also obtains "0.333" as the second ratio RN2 by dividing the difference "120" between the first black determination value DVBK1 and the target determination value TDV by the difference "360" between the first black determination value DVBK1 and the second black determination value DVBK2. In response to input of the fifth acquisition signal AS5, the black data acquisition unit 53 transmits the first black data BK1 and the second black data BK2 to the black reference data calculator 56. For each pixel from the leading pixel to the final pixel, the black reference data calculator 56 adds the first black data BK1 multiplied by the first ratio RN1 to the second black data BK2 multiplied by the second ratio RN2, and transmits the added value to the black corrector 71 as the black reference data BKSD. In response to input of "2" as the processing line number PLN, the data acquisition unit 48 acquires the line data LD in the second line memory 432, and transmits the acquired line data LD to the black corrector 71. The black corrector 71 calculates the black correction data BKCD by subtracting the black reference data BKSD from the inputted line data LD, and transmits the correction end signal CES to the black reference data determiner 47.

In response to input of the correction end signal CES when the processing line number PLN is "2", the processing line counter 50 transmits "3" as the processing line number PLN to the determination data acquisition unit 51, the data acquisition unit 48, and the white corrector 72. In response to input of "3" as the processing line number PLN, the determination data acquisition unit 51 acquires "600" of the third determination value DV3 as the target determination value TDV, and acquires "40" that is the first black determination value DVBK1 and "400" that is the second black determination value DVBK2. The black comparator 52 determines that "600" of the target determination value TDV is not equal to any one of "40" that is the first black data BK1 and "400" that is the second black data BK2, and transmits the white comparison signal WHCS to the determination data acquisition unit 51. The determination data acquisition unit 51 transmits "550" of the third white determination value DVWH3 to the white comparator 54 as the target white determination value TDVWH. The white comparator 54 determines that "600" of the target determination value TDV is larger than "550" of the target white determination value TDVWH, determines that the first black determination value DVBK1 is smaller than or equal to the second black determination value DVBK2, and transmits the third acquisition signal AS3 to the black data acquisition unit 53. In response to input of the third acquisition signal AS3, the black data acquisition unit 53 transmits the first black data BK1 to the black corrector 71 as the black reference data BKSD. In response to input of "3" as the processing line number PLN, the data acquisition unit 48 acquires the line data LD in the third line memory 433, and transmits the acquired line data LD to the black corrector 71. The black corrector 71 calculates the black correction data BKCD by subtracting the black reference data BKSD from the inputted line data LD.

EFFECTS OF EMBODIMENT

In this embodiment, the switcher 40 transmits the inputted digital data DD to the black data memory 44 when the line number LN is "1", and transmits the inputted digital data DD to the image data memory 43 when the line number LN is "2", "3", or "4". The black data memory 44 stores the digital data DD of two lines. In response to determining that the target determination value TDV is equal to the first black determination value DVBK1, the black comparator 52 transmits the first acquisition signal AS1 to the black data acquisition unit 53. In response to determining that the target determination value TDV is equal to the second black determination value DVBK2, the black comparator 52 transmits the second acquisition signal AS2 to the black data acquisition unit 53. In response to input of the first acquisition signal AS1, the black data acquisition unit 53 transmits the first black data BK1 to the black corrector 71 as the black reference data BKSD. In response to input of the second acquisition signal AS2, the black data acquisition unit 53 transmits the second black data BK2 to the black corrector 71 as the black reference data BKSD. The data acquisition unit 48 acquires the line data LD from the image data memory 43, and transmits the line data LD to the black corrector 71. The black corrector 71 executes black correction processing on the line data LD based on the black reference data BKSD. In this way, the black reference data BKSD is determined based on the second black data BK2 that is generated before the line data LD is generated and on the first black data BK1 that is generated after the line data LD is generated. Thus, even when the document cover CV is opened or closed in the middle of generating the line data LD, the black reference data BKSD can be determined accurately.

In response to determining that the target determination value TDV is not equal to any one of the first black determination value DVBK1 and the second black determination value DVBK2, the black comparator 52 transmits the white comparison signal WHCS to the determination data acquisition unit 51. In response to input of the white comparison signal WHCS, the determination data acquisition unit 51 transmits the target white determination value TDVWH to the white comparator 54. In response to determining that the target determination value TDV is larger than the target white determination value TDVWH, the white comparator 54 determines whether the first black determination value DVBK1 is smaller than or equal to the second black determination value DVBK2. In response to determining that the first black determination value DVBK1 is smaller than or equal to the second black determination value DVBK2, the white comparator 54 transmits the third acquisition signal AS3 to the black data acquisition unit 53. In response to determining that the first black determination value DVBK1 is not smaller than or equal to the second black determination value DVBK2, the white comparator 54 transmits the fourth acquisition signal AS4 to the black data acquisition unit 53. In response to determining that the target determination value TDV is not larger than the target white determination value TDVWH, the white comparator 54 transmits the fifth acquisition signal AS5 to the black data acquisition unit 53, and also transmits the target determination value TDV, the first black determination value DVBK1, and the second black determination value DVBK2 to the ratio calculator 55. In response to input of the third acquisition signal AS3, the black data acquisition unit 53 transmits the first black data BK1 to the black corrector 71 as the black reference data BKSD. In response to input of the fourth acquisition signal AS4, the black data acquisition unit 53 transmits the second black data BK2 to the black corrector 71 as the black reference data BKSD. In response to input of the fifth acquisition signal AS5, the black data acquisition unit 53 transmits the first black data BK1 and the second black data BK2 to the black reference data calculator 56. In response to input of the target determination value TDV, the first black determination value DVBK1, and the second black determination value DVBK2, the ratio calculator 55 calculates the first ratio RN1 and the second ratio RN2 and transmits the calculated first ratio RN1 and second ratio RN2 to the black reference data calculator 56. The black reference data calculator 56 calculates the black reference data BKSD from the first black data BK1, the second black data BK2, the first ratio RN1, and the second ratio RN2, and transmits the calculated black reference data BKSD to the black corrector 71. A case where the target determination value TDV is larger than the target white determination value TDVWH corresponds to a case where the document cover CV is closed, and the first black data BK1 or the second black data BK2 that is generated when the document cover CV is closed is determined as the black reference data BKSD. In a case where the target determination value TDV is not larger than the target white determination value TDVWH, the black reference data BKSD is calculated from the first black data BK1, the second black data BK2, the first ratio RN1, and the second ratio RN2. (In other words, the data obtained by performing interpolation on the first black data BK1 and the second black data BK2 is determined as the black reference data BKSD.) Thus, even when the document cover CV is opened or closed in the middle of generating the line data LD, the black reference data BKSD can be determined accurately.

In response to determining that the target determination value TDV is equal to the first black determination value DVBK1, the black reference data determiner 47 determines, as the black reference data BKSD, the first black data BK1 that is acquired after the line data LD is acquired. In response to determining that the target determination value TDV is equal to the second black determination value DVBK2, the black reference data determiner 47 determines, as the black reference data BKSD, the second black data BK2 that is acquired before the line data LD is acquired. Thus, even when the document cover CV is opened or closed in the middle of generating the line data LD, the black reference data BKSD can be determined accurately.

The first black determination value DVBK1 is calculated by averaging the first black data BK1 of all the pixels in the non-document region NGSR. The second black determination value DVBK2 is calculated by averaging the second black data BK2 of all the pixels in the non-document region NGSR. The target determination value TDV is calculated by averaging the line data LD of all the pixels in the non-document region NGSR. Thus, the first black determination value DVBK1, the second black determination value DVBK2, and the target determination value TDV can be calculated accurately.

The white determination value is calculated by multiplying an average value of white data of all the pixels in the non-document region NGSR by a particular value smaller than one. Thus, even if the white color of the reference member BM (white member) is different from the white color of the surface of the document cover CV, an open/close state of the document cover CV can be determined accurately based on the white determination value calculated in this way.

The black reference data determiner 47 determines, as the black reference data BKSD, black interpolation data that is obtained by adding the first black data BK1 multiplied by the first ratio RN1 to the second black data BK2 multiplied by the second ratio RN2 for each pixel in one line. Thus, even when the document cover CV is opened or closed in the middle of generating the line data LD, the black reference data BKSD can be determined accurately.

In summary, in response to determining that the document cover CV is in the open state both when the line data LD is acquired and when the first black data BK1 is acquired, the first black data BK1 is determined as the black reference data BKSD. In response to determining that the document cover CV is in the open state both when the line data LD is acquired and when the second black data BK2 is acquired, the second black data BK2 is determined as the black reference data BKSD. In response to determining that the document cover CV is in the closed state both when the line data LD is acquired and when the first black data BK1 is acquired, the first black data BK1 is determined as the black reference data BKSD. In response to determining that the document cover CV is in the closed state both when the line data LD is acquired and when the second black data BK2 is acquired, the second black data BK2 is determined as the black reference data BKSD. In response to determining that the document cover CV is between the open state and the closed state when the line data LD is acquired, data between the first black data BK1 and the second black data BK2 (for example, interpolated data) is determined as the black reference data BKSD.

The image scanner SM, the document table DT, the document cover CV, and the reference member BM are non-limiting examples of an image scanner, a document table, a document cover, and a white member, respectively. The light source 21 and the rod lens 24 are a non-limiting example of a light source. The light receiver 22 and the AFE 35 are a non-limiting example of a reader. The driving circuit 37, the conveyance motor MT, and the movement mechanism MM are a non-limiting example of a mover. The processing R3 to the processing R6 executed by the CPU 30 are a non-limiting example of a data acquisition processor. The black corrector 71 is a non-limiting example of a black corrector. The black reference data determiner 47 is a non-limiting example of a black reference data determiner. The switcher 40 and the averaging circuit 45 are a non-limiting example of a first black determination value calculator, a second black determination value calculator, and a target determination value calculator. The black comparator 52 is a non-limiting example of a black determiner. The processing RA3 executed by the CPU 30 is a non-limiting example of a white data acquisition unit. The processing RA5, the processing RA6, and the processing RA7 are a non-limiting example of a white determination value calculator. The white comparator 54 is a non-limiting example of a white determiner and a black comparator. The ratio calculator 55 is a non-limiting example of a ratio calculator. The first black data BK1 is a non-limiting example of post-reading black data. The second black data BK2 is a non-limiting example of pre-reading black data.

While the disclosure has been described in detail with reference to the above aspects thereof, it would be apparent to those skilled in the art that various changes and modifications may be made therein without departing from the scope of the claims. Examples are provided below.

(1) The image scanner SM according to the above-described embodiment may be applied to a multifunction peripheral including a printer unit. In addition, the above-described embodiment has exemplified the case in which the reader 20 is formed from a CIS. Alternatively, the reader 20 may be formed from a CCD unit on which a CCD (Charge Coupled Device) is mounted and which moves in the sub-scanning direction, or may be formed from a reading unit configured such that a CCD element is fixed and a light source and a mirror move in the sub-scanning direction.

(2) In the above-described embodiment, it is described the black reference data BKSD is determined by the image processor 36 which is a hardware processor. Alternatively, for example, the black reference data BKSD may be determined by software processing executed by the CPU 30.

(3) In the above-described embodiment, the target determination value TDV, the first black determination value DVBK1, and the second black determination value DVBK2 are calculated by using the digital data DD in the non-document region NGSR. Alternatively, for example, another transparent plate may be provided at a part other than the transparent plate TP supporting an original document, and a detection region for acquiring the above determination values may be provided in the other transparent plate.

(4) In the above-described embodiment, the black reference data BKSD is determined by using the target determination value TDV, the first black determination value DVBK1, and the second black determination value DVBK2. Alternatively, for example, a cover sensor for detecting an open/close state of the document cover CV may be provided. In this case, the line data LD acquired when the cover is open may be determined by using, as the black reference data, the black data acquired when the cover is open. And, the line data LD acquired when the cover is closed may be determined by using, as the black reference data, the black data acquired when the cover is closed.

(5) In the above-described embodiment, the white determination value TDVWH is acquired by reading the reference member BM. Alternatively, for example, the white determination value TDVWH may be acquired by reading the document cover CV when the document cover CV is in a closed state.

(6) In the above-described embodiment, the black reference data calculator 56 calculates the black reference data BKSD by adding the first black data BK1 multiplied by the first ratio RN1 to the second black data BK2 multiplied by the second ratio RN2. Alternatively, for example, the black reference data BKSD may be calculated by another interpolation processing based on the first black data BK1 and the second black data BK2.

(7) In the above-described embodiment, the target determination value TDV, the first black determination value DVBK1, and the second black determination value DVBK2 are calculated by averaging the digital data DD in the non-document region NGSR. Alternatively, for example, a median value of the digital data DD in the non-document region NGSR may be used as the target determination value TDV, the first black determination value DVBK1, and the second black determination value DVBK2.

(8) In the above-described embodiment, the first white determination value DVWH1 is calculated by multiplying the first particular value, the second white determination value DVWH2 is calculated by multiplying the second particular value, and the third white determination value DVWH3 is calculated by multiplying the third particular value. Alternatively, for example, the reference member BM at a position facing the non-document region NGSR may have the same color as the document cover CV. And, without multiplying the first particular value, the second particular value, and the third particular value, an average value of the digital data DD in the non-document region NGSR may be calculated as the first white determination value DVWH1, the second white determination value DVWH2, and the third white determination value DVWH3.

What is claimed is:

1. An image scanner comprising:
    a document table configured to support an original document;
    a document cover configured to move between an open state in which the document table is exposed and a closed state in which the document table is covered;
    a light source configured to emit light;
    an image sensor configured to receive light and to perform photoelectric conversion on the received light to generate line data that is data of a plurality of pixels in one line extending in a main scanning direction; and
    a circuit configured to:
        acquire, as pre-reading black data, the line data that is generated by the image sensor in a state where the light source is turned off;
        after acquiring the pre-reading black data, acquire, as line image data, the line data that is generated by the image sensor in a state where light is emitted from the light source to an original document supported on the document table;
        after acquiring the line image data, acquire, as post-reading black data, the line data that is generated by the image sensor in a state where the light source is turned off;
        determine black reference data based on the post-reading black data and the pre-reading black data; and
        perform black correction on the line image data based on the black reference data.

2. The image scanner according to claim 1, wherein the document table includes a non-document region configured not to support an original document with respect to the main scanning direction in a state where the document table supports the original document having a largest size that is read by the image sensor; and
    wherein the circuit is configured to:
        calculate a first black determination value based on the post-reading black data in the non-document region;
        calculate a second black determination value based on the pre-reading black data in the non-document region;
        calculate a target determination value based on the line image data in the non-document region;
        determine whether the target determination value is equal to the first black determination value or whether the target determination value is equal to the second black determination value;
        in response to determining that the target determination value is equal to the first black determination value, determine the post-reading black data as the black reference data; and
        in response to determining that the target determination value is equal to the second black determination value, determine the pre-reading black data as the black reference data.

3. The image scanner according to claim 2, wherein the circuit is configured to:
    calculate the first black determination value by averaging the post-reading black data of all pixels in the non-document region;
    calculate the second black determination value by averaging the pre-reading black data of all pixels in the non-document region; and
    calculate the target determination value by averaging the line image data of all pixels in the non-document region.

4. The image scanner according to claim 2, further comprising:
- a mover configured to move the image sensor in a sub-scanning direction perpendicular to the main scanning direction; and
- a white member having a white region that serves as a density reference of a white color,
- wherein a surface of the document cover facing the image sensor in the non-document region in the closed state has a white color;
- wherein the circuit is configured to:
  - control the mover to move the image sensor to a position facing the white member, control the light source to emit light to the white member, and acquire, as white data, the line data that is generated by the image sensor;
  - calculate a white determination value based on the white data in the non-document region;
  - determine whether the target determination value is equal to any one of the first black determination value and the second black determination value;
  - in response to determining that the target determination value is not equal to any one of the first black determination value and the second black determination value, determine whether the target determination value is larger than the white determination value;
    - in response to determining that the target determination value is larger than the white determination value, determine whether the first black determination value is smaller than or equal to the second black determination value;
      - in response to determining that the first black determination value is smaller than or equal to the second black determination value, determine the post-reading black data as the black reference data; and
      - in response to determining that the first black determination value is larger than the second black determination value, determine the pre-reading black data as the black reference data; and
    - in response to determining that the target determination value is not larger than the white determination value, determine, as the black reference data, black interpolation data that is calculated by interpolating the post-reading black data and the pre-reading black data.

5. The image scanner according to claim 4, wherein the circuit is configured to calculate the white determination value by multiplying an average value by a particular value smaller than one, the average value being obtained by averaging the white data of all pixels in the non-document region.

6. The image scanner according to claim 4, wherein the circuit is configured to:
- calculate a first black ratio by dividing a difference between the second black determination value and the target determination value by a difference between the first black determination value and the second black determination value; and
- calculate a second black ratio by dividing a difference between the first black determination value and the target determination value by the difference between the first black determination value and the second black determination value; and
- wherein the black interpolation data is obtained by adding the post-reading black data multiplied by the first black ratio to the pre-reading black data multiplied by the second black ratio for each pixel in one line.

7. The image scanner according to claim 1, wherein the circuit is configured to:
- in response to determining that the document cover is in the open state both when the line image data is acquired and when the post-reading black data is acquired, determine the post-reading black data as the black reference data;
- in response to determining that the document cover is in the open state both when the line image data is acquired and when the pre-reading black data is acquired, determine the pre-reading black data as the black reference data;
- in response to determining that the document cover is in the closed state both when the line image data is acquired and when the post-reading black data is acquired, determine the post-reading black data as the black reference data;
- in response to determining that the document cover is in the closed state both when the line image data is acquired and when the pre-reading black data is acquired, determine the pre-reading black data as the black reference data; and
- in response to determining that the document cover is between the open state and the closed state when the line image data is acquired, determine data between the post-reading black data and the pre-reading black data as the black reference data.

8. A method of performing black correction in an image scanner including a document table, a document cover configured to move between an open state in which the document table is exposed and a closed state in which the document table is covered, a light source configured to emit light, and an image sensor configured to receive light and to perform photoelectric conversion on the received light to generate line data that is data of a plurality of pixels in one line extending in a main scanning direction, the method comprising:
- acquire, as pre-reading black data, the line data that is generated by the image sensor in a state where the light source is turned off;
- after acquiring the pre-reading black data, acquire, as line image data, the line data that is generated by the image sensor in a state where light is emitted from the light source to an original document supported on the document table;
- after acquiring the line image data, acquire, as post-reading black data, the line data that is generated by the image sensor in a state where the light source is turned off;
- determine black reference data based on the post-reading black data and the pre-reading black data; and
- perform black correction on the line image data based on the black reference data.

* * * * *